(12) United States Patent
Huang et al.

(10) Patent No.: US 11,293,423 B2
(45) Date of Patent: Apr. 5, 2022

(54) COMPRESSOR AND PROCESSING METHOD THEREFOR

(71) Applicant: SHANGHAI HIGHLY ELECTRICAL APPLIANCES CO., LTD., Shanghai (CN)

(72) Inventors: Zhimin Huang, Shanghai (CN); Jie Li, Shanghai (CN); Zhaodi Fan, Shanghai (CN); Hongsheng Yue, Shanghai (CN); Xiaoxing Jin, Shanghai (CN)

(73) Assignee: SHANGHAI HIGHLY ELECTRICAL APPLIANCES CO., LTD., Shanghai (CN)

( * ) Notice: Subject to any disclaimer, the term of this patent is extended or adjusted under 35 U.S.C. 154(b) by 324 days.

(21) Appl. No.: 16/336,475

(22) PCT Filed: Dec. 9, 2016

(86) PCT No.: PCT/CN2016/109141
§ 371 (c)(1),
(2) Date: Mar. 26, 2019

(87) PCT Pub. No.: WO2018/053946
PCT Pub. Date: Mar. 29, 2018

(65) Prior Publication Data
US 2019/0249655 A1    Aug. 15, 2019

(30) Foreign Application Priority Data
Sep. 26, 2016  (CN) .......................... 201610850754.5

(51) Int. Cl.
*F04B 39/12*    (2006.01)
*C09D 5/08*     (2006.01)
(Continued)

(52) U.S. Cl.
CPC .............. *F04B 39/121* (2013.01); *B05D 7/50* (2013.01); *C09D 5/002* (2013.01); *C09D 5/08* (2013.01);
(Continued)

(58) Field of Classification Search
CPC .............. C09D 5/08; C09D 163/00–10; C09D 167/00; C09D 133/00–24; F04B 39/12;
(Continued)

(56) References Cited

U.S. PATENT DOCUMENTS 4,471,108 A * 9/1984 Beider ................. C09D 167/00
                                                    528/272
4,537,632 A   8/1985 Mosser
(Continued)

FOREIGN PATENT DOCUMENTS

CN         1362292      8/2002
CN        101939161     1/2011
(Continued)

OTHER PUBLICATIONS

Partial machine translation of CN-105499108-A (2016).*
"International Search Report (Form PCT/ISA/210)", dated Jun. 19, 2017, with English translation thereof, pp. 1-4.

*Primary Examiner* — Kregg T Brooks
(74) *Attorney, Agent, or Firm* — JCIP Global Inc.

(57) ABSTRACT

A compressor includes a housing, and an anticorrosive coating covering a surface of the housing. The anticorrosive coating includes a base layer applied on the surface of the housing, and a surface layer applied on the base layer. Both the base layer and the surface layer are organic coatings. Thus, the housing of the compressor is effectively separated from the external environment by means of the two organic coatings, so as to ensure that the compressor is not corroded; moreover, the anticorrosive coating does not contain a metal (Continued)

coating, thereby preventing the problem of the compressor being severely corroded due to an exposed metal coating.

11 Claims, 2 Drawing Sheets

(51) Int. Cl.
    *F25B 31/00*     (2006.01)
    *B05D 7/00*     (2006.01)
    *C09D 133/00*     (2006.01)
    *C09D 5/00*     (2006.01)
    *C09D 133/14*     (2006.01)
    *C09D 163/00*     (2006.01)
    *C09D 167/00*     (2006.01)
    *C23C 26/00*     (2006.01)
(52) U.S. Cl.
    CPC ......... *C09D 133/00* (2013.01); *C09D 133/14* (2013.01); *C09D 163/00* (2013.01); *C09D 167/00* (2013.01); *C23C 26/00* (2013.01); *F04B 39/12* (2013.01); *F25B 31/00* (2013.01); *F05B 2230/31* (2013.01); *F05C 2201/0439* (2013.01); *F05C 2201/0454* (2013.01); *F05C 2225/00* (2013.01); *F25B 2347/00* (2013.01); *F25B 2400/07* (2013.01)

(58) Field of Classification Search
    CPC ........... F04B 39/121; B05D 7/50–5885; F25B 2400/07; F25B 2400/071; F25B 31/00; F25B 2347/00
    See application file for complete search history.

(56) References Cited

U.S. PATENT DOCUMENTS

| | | | |
|---|---|---|---|
| 6,026,731 A | 2/2000 | Hinrichs et al. | |
| 2003/0194576 A1* | 10/2003 | Cooper | F04B 39/121 |
| | | | 428/626 |
| 2006/0204665 A1 | 9/2006 | Buczek et al. | |
| 2011/0256389 A1* | 10/2011 | Dendis | C09D 5/103 |
| | | | 428/337 |
| 2018/0291230 A1* | 10/2018 | Zhou | C09D 7/00 |

FOREIGN PATENT DOCUMENTS

| | | | |
|---|---|---|---|
| CN | 203305619 | | 11/2013 |
| CN | 105422421 | | 3/2016 |
| CN | 105499108 A | * | 4/2016 |
| CN | 105624605 | | 6/2016 |
| CN | 206092339 | | 4/2017 |
| EP | 1219726 | | 7/2002 |
| JP | 2003278656 | | 10/2003 |
| JP | 2010127272 | | 6/2010 |

* cited by examiner

US 11,293,423 B2

COMPRESSOR AND PROCESSING METHOD THEREFOR

CROSS-REFERENCE TO RELATED APPLICATION

This is a 371 application of the International PCT application serial no. PCT/CN2016/109141, filed on Dec. 9, 2016 which claims the priority benefits of China Application No. 201610850754.5 filed on Sep. 26, 2016. The entirety of each of the above-mentioned patent applications is hereby incorporated by reference herein and made a part of this specification.

BACKGROUND

Technical Field

The present invention relates to a compressor, and in particular, to a compressor having an anticorrosive coating layer and a processing method therefor.

Description of Related Art

A housing of a compressor is usually formed by stamping low carbon steel by hot rolling or cold rolling, or is made of gray cast iron. Therefore, if the compressor has no anticorrosive coating layer, the steel or iron may be quickly corroded even though in a non-marine environment.

An existing anticorrosive coating layer formed on a compressor usually includes: a metal coating layer applied on a surface of a housing of the compressor, where the metal coating layer is, for example, aluminum (Al) or zinc (Zn); and a paint coating layer sprayed on the metal coating layer, where the paint coating layer is used as a surface layer to isolate the metal coating layer from an ambient environment.

However, the anticorrosive coating layer formed by applying the paint coating on the metal coating layer has the following defects: The paint coating is usually thin and easily pierced by a sharp object, exposing the metal coating layer. In addition, there are numerous pores in the metal coating layer. Therefore, once the metal coating layer is exposed outside (for example, exposed in a marine environment) due to damage of the surface layer, the pores become interconnecting pores connecting the marine environment and the compressor, thereby causing a severe corrosion of the compressor.

SUMMARY

It is an object of the present invention to provide a compressor and a processing method therefor, to solve the problem that a compressor is severely corroded due to easy damage of an existing anticorrosive coating layer of the compressor.

To solve the foregoing technical problem, the present invention provides a compressor, including a housing and an anticorrosive coating layer covering a surface of the housing, wherein the anticorrosive coating layer includes a base layer applied on the surface of the housing and a surface layer applied on the base layer, and the base layer and the surface layer are both organic coating layers.

Optionally, in the foregoing compressor, a material of the base body layer is epoxy resin.

Optionally, in the foregoing compressor, a thickness of the base body layer is greater than or equal to 10 µm.

Optionally, in the foregoing compressor, a material of the base body layer is acrylic amino or polyester resin.

Optionally, in the foregoing compressor, a thickness of the base body layer is greater than or equal to 6 µm.

Optionally, in the foregoing compressor, a material of the housing is carbon steel or gray cast iron.

Optionally, in the foregoing compressor, a phosphating layer is further formed between the surface of the housing of the compressor and the base layer.

Another object of the present invention is to provide a processing method for forming the foregoing compressor. The method is configured to form an anticorrosive coating layer of the compressor, and includes: applying a first organic coating onto a surface of a housing of the compressor, to form a base layer; and applying a second organic coating onto a surface of the base layer, to form a surface layer.

Optionally, the foregoing processing method further comprises, before forming a base layer, performing a surface treatment on the housing of the compressor to improve adhesion between the base layer and the surface of the housing of the compressor.

Optionally, in the foregoing processing method, the surface treatment includes performing shot-peening treatment on the surface of the housing of the compressor.

Optionally, in the foregoing processing method, the surface treatment includes treating the surface of the housing of the compressor by using phosphate to form a phosphating layer.

Optionally, in the foregoing processing method, a time interval between completion of the surface treatment and application of the first organic coating is less than 8 hours.

Optionally, in the foregoing processing method, the first organic coating is an epoxy resin system coating.

Optionally, in the foregoing processing method, the epoxy resin system coating is a powder coating.

Optionally, in the foregoing processing method, the powder coating of epoxide resin system is sprayed onto the surface of the housing of the compressor by electrostatic spraying.

Optionally, in the foregoing processing method, the second organic material is an acrylic amino system coating.

Optionally, in the foregoing processing method, the acrylic amino system coating is a water-based paint.

Optionally, in the foregoing processing method, the water-based paint of the acrylic amino system is applied onto the surface of the base layer by dip-coating or spraying.

Optionally, in the foregoing processing method, the second organic coating is a polyester resin system coating.

Optionally, in the foregoing processing method, the polyester resin system coating is a powder coating.

Optionally, in the foregoing processing method, the powder coating of the polyester resin system is sprayed onto the surface of the base layer by electrostatic spraying.

Optionally, the foregoing processing method further comprises baking the first organic coating after applying a first organic coating, and baking the second organic coating after applying a second organic coating.

Optionally, the foregoing processing method further comprises performing coating detection on the anticorrosive coating layer after forming the anticorrosive coating layer, wherein the coating detection includes a thickness detection, a scratch detection, and/or a bubble detection.

In the compressor and the processing method therefor provided in the present invention, the formed anticorrosive coating layer includes two organic coating layers, through which the housing of the compressor is able to be effectively isolated from the ambient environment, thereby ensuring that the compressor is not corroded. In addition, the anticorrosive coating layer in the present invention does not include a metal coating layer, thereby avoiding the problem that the compressor is severely corroded due to an exposed metal coating layer. Further, the base layer is formed by using the powder coating of the epoxy resin system, the coating formed by which is compact and smooth with strong corrosion resistant performance, and the surface layer is formed by using powder coating of the polyester resin system or the water-based paint of the acrylic amino system, which has a strong weatherability, so that protection strength of the base layer is able to be improved, thereby increasing the service life of the compressor. Further, in the present invention, the powder coating and the water-based coating are creatively applied to the compressor field. Compared with a conventional coating such as a paint, on one hand, the powder coating and the water-based coating have a higher utilization and a more flexible coating way, and on the other hand, the coating used in the present invention are all environmentally friendly coating, thereby enabling to effectively avoid the problem of environmental pollution.

DESCRIPTION OF THE EMBODIMENTS

A core concept of the present invention is to provide a compressor and a processing method therefor. The compressor includes a housing and an anticorrosive coating layer covering the surface of the housing. The anticorrosive coating layer includes a base layer and a surface layer, the base layer is applied onto the surface of the housing, and the surface layer is applied onto the base layer. In addition, the base layer and the surface layer are both organic coating layers.

In the compressor provided in the present invention, the anticorrosive coating layer includes the base layer and the surface layer, through which the housing of the compressor is able to be effectively isolated from an ambient environment, thereby ensuring that the compressor is not corroded. In addition, the base layer and the surface layer are both organic coating layers. In this way, even if the surface layer is damaged, the compressor is not severely corroded due to exposure of the base layer. Moreover, the processing method of the compressor provided in the present invention is simple. In addition, the anticorrosive coating layer formed by using the processing method has advantages of a compact and smooth surface, so that the corrosion resistance and weatherability of the anticorrosive coating layer is able to be improved, and further a service life of the compressor is able to be effectively increased.

The compressor and the processing method therefor provided in the present invention are further described in detail with reference to the accompanying drawings and specific embodiments. Advantages and features of the present invention will be more apparent according to the following description and the appended claims. It should be noted that the accompanying drawings are presented in a very simplified form and not necessarily presented to scale, with the only intention to facilitate convenience and clarity in explaining the object of the present invention.

Figure 1:
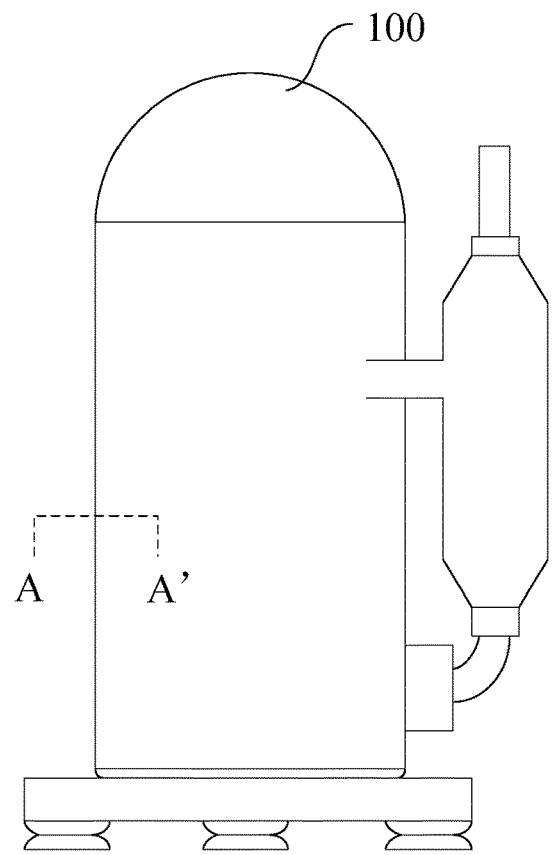
FIG. 1 is a schematic structural diagram of a compressor according to an embodiment of the present invention.
Figure 2:
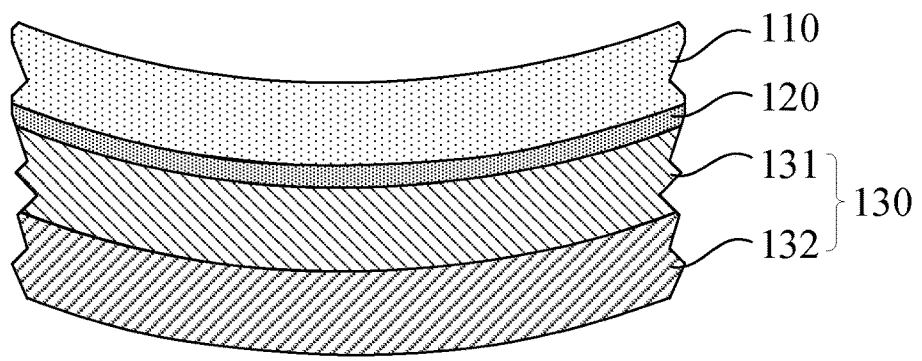
FIG. 2 is a schematic cross-sectional view of a housing of the compressor according to the embodiment of the present invention.

FIG. 1 is a schematic structural diagram of a compressor according to an embodiment of the present invention. FIG. 2 is a schematic cross-sectional view of a housing of the compressor according to the embodiment of the present invention, to be specific, a schematic cross-sectional view along an AA' direction of FIG. 1. As shown in FIG. 1 and FIG. 2, the compressor 100 includes a housing 110 and an anticorrosive coating layer 130 covering a surface of the housing. The anticorrosive coating layer 130 includes a base layer 131 applied on the surface of the housing 110 and a surface layer 132 applied on the base layer 131. In addition, the base layer 131 and the surface layer 132 are both organic coating layers. That is, the anticorrosive coating layer 130 in the compressor provided in the present invention has two organic coating layers. The base layer 131 is able to effectively protect the housing of the compressor from corrosion, and the surface layer 132 further strengthens the corrosion resistant performance of the compressor. In addition, the surface layer 132 can be used to protect the base layer 131, so that the corrosion resistant performance of the compressor is able to be improved due to avoidance of the exposure of the base layer 131, thereby effectively prolonging a service life of the compressor. Moreover, even if the surface layer 132 is damaged, the compressor provided in the present invention is not corroded due to exposure of the base layer 131 in the compressor.

Specifically, a material of the housing 110 of the compressor may be carbon steel or gray cast iron, which is the commonly used material of a housing of a compressor in the art. However, due to the fact that the material of the housing 110, i.e. usually being carbon steel or gray cast iron, is easy to be corroded, it is particularly important to improve corrosion resistant performance of the compressor 100 to ensure structural compressor integrity.

In this embodiment, the base layer 131 of the anticorrosive coating layer 130 is preferably an epoxy resin system coating. Due to the good physical and chemical stability of the epoxy resin, the product made of epoxy resin is not easily deformed and has good corrosion resistant performance. Moreover, the epoxy resin has excellent adhesive strength on surfaces of both a metal material and a non-metal material. That is, using the epoxy resin system coating as the base layer 131 can effectively protect the compressor against corrosion, and the formed base body layer 131 does not easily shed from the compressor 100 to destroy integrity of the anticorrosive coating layer 130, thereby further improving the corrosion resistant performance of the compressor. Compared with the existing anticorrosive coating layer, in this embodiment, the metal coating layer is replaced with an organic coating layer of an epoxy resin system as the base layer, thereby avoiding existence of the metal coating layer, and further avoiding a problem of easy corrosion of the compressor due to pores in the metal coating layer. Further, the thickness of the base layer 131 is greater than or equal to 10 μm, and preferably 45 μm to 95 μm.

Preferably, in the anticorrosive coating layer 130, the surface layer 132 is a coating of the acrylic amino system or of the polyester resin system. The acrylic amino system coating and the polyester resin system coating each have strong weatherability. That is, the aging phenomenon such as cracking or shedding due to influence of an ambient condition such as sunshine or a temperature change does not occur in the acrylic amino system coating and the polyester resin system coating. Therefore, even if the compressor 100 is in an environment with high temperature, high humidity, and strong ultraviolet irradiation, the surface layer 132 can still maintain integrity thereof, and further effectively protect the base layer 131 covered by the surface layer 132, to ensure the corrosion resistant performance of the compressor 100. Further, the thickness of the surface layer 132 is greater than or equal to 6 μm. Still further, the thickness of the acrylic amino system coating is preferably 10 μm to 40 μm, and the thickness of the polyester resin system coating is preferably 10 μm to 85 μm.

Still referring to FIG. 2, the compressor 100 further includes a phosphating layer 120 located between the housing 110 and the anticorrosive coating layer 130. Adhesion performance between the subsequently formed base layer 131 and the housing 110 can be effectively improved through the phosphating layer 120, so that the problem of shedding of the base layer 131 is able to be improved. In this embodiment, a material of the phosphating layer 120 is iron phosphate. For the phosphating layer 120, the surface of the housing 110 may be treated with phosphate to form an iron phosphate layer thereon.

Figure 3:
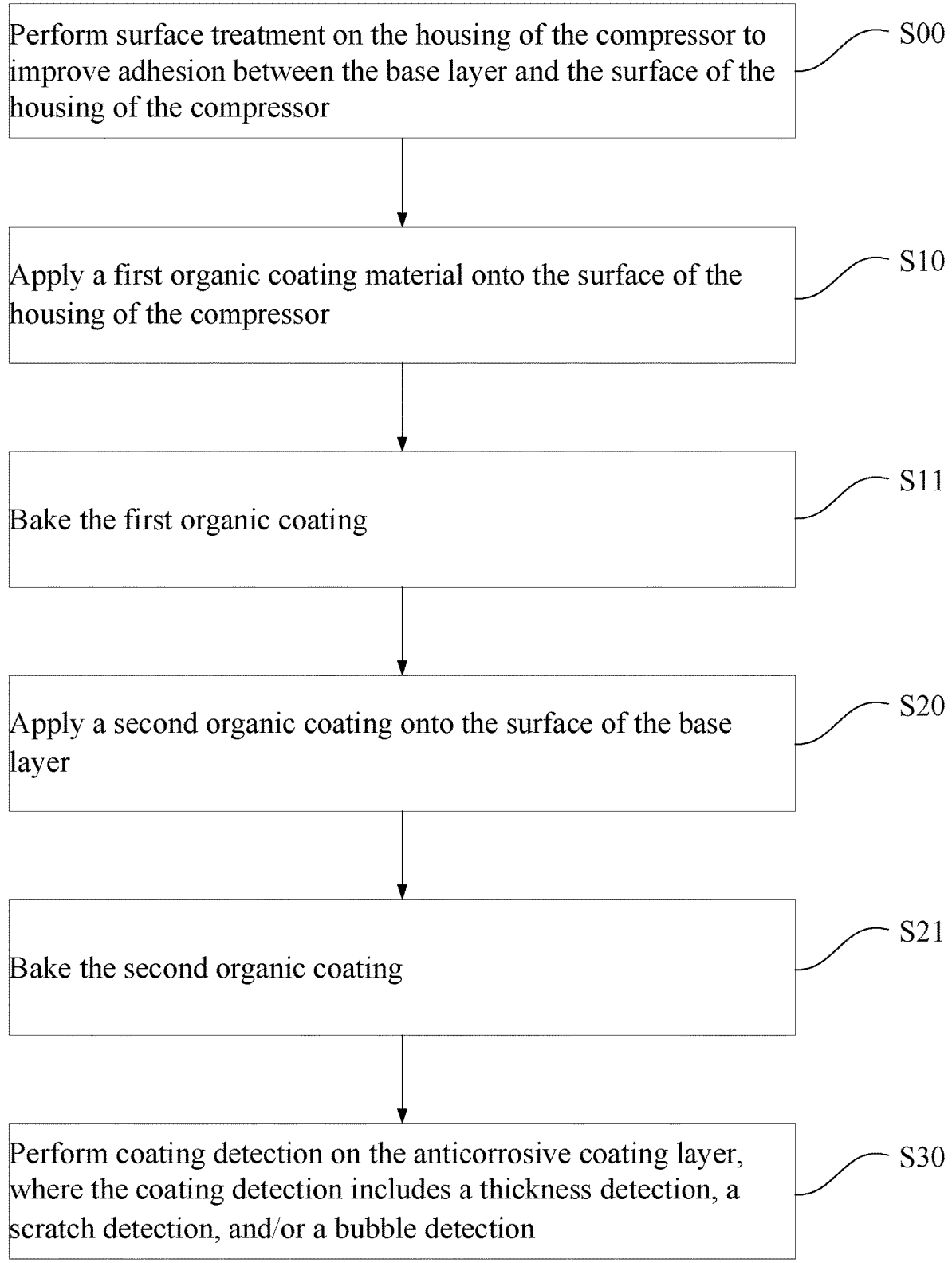
FIG. 3 is a schematic flowchart of a processing method of the compressor according to the embodiment of the present invention.

According to the foregoing compressor, the present invention further provides a processing method of a compressor, which is specifically used to form an anticorrosive coating layer of the compressor. FIG. 3 is a schematic flowchart of a processing method of the compressor according to the embodiment of the present invention. Referring to FIG. 3 in combination with FIG. 1 and FIG. 2, the processing method of a compressor includes:

Step S10. Apply a first organic coating onto the surface of the housing 110 of the compressor, to form a base layer 131.

Step S20. Apply a second organic coating onto the surface of the base layer 131, to form a surface layer 132.

In this embodiment, before step S20 is performed to form the base layer 131, the method further includes:

Step S00. Perform a surface treatment on the housing 110 of the compressor, to improve adhesion between the subsequently formed base layer 131 and the housing 110, and to solve problems such as bubbling, cracking, and even shedding that occur in the anticorrosive coating layer 130 after long-term use of the compressor.

Specifically, the surface treatment may be: performing shot-peening treatment on the surface of the housing of the compressor. The shot-peening treatment performed on the surface of the housing 110 not only removes stains on the surface of the housing 110, but also coarsens the surface of the housing 110, thereby facilitating a firmer adhesion of the subsequently formed base layer 131 to the housing 110.

Alternatively, the surface treatment may be: treating the surface of the housing of the compressor with phosphate to form a phosphating layer 120. That is, the phosphating layer 120 is generated on the surface of the housing 110, through which the adhesion performance between the base body layer 131 and the housing 110 can be greatly improved. In this embodiment, the material of the housing 110 is carbon steel or gray cast iron. Therefore, when the housing is treated with phosphate, the phosphating layer 120 generated therefrom is iron phosphide.

Still referring to FIG. 3, after step S00 is performed to complete surface treatment on the housing 110, step S10 is performed to apply a first organic coating onto the housing 110. Preferably, a time interval between completion of the surface treatment and application of the first organic coating is less than 8 hours. In this way, on one hand, cleanness of the housing can be ensured during application of the first organic coating, and on the other hand, the surface of the housing 110 can be prevented from being oxidized due to the long-time placement, thereby improving adhesion performance between the base layer 131 and the housing 110, and prolonging the service life of the base layer 131.

Step S10. Apply a first organic coating onto the surface of the housing 110 of the compressor. In this embodiment, the first organic coating is a coating of the epoxy resin system. Preferably, the epoxy resin system coating is a powder coating. Compared to the metal coating layer, the powder coating has a high utilization, and is more easily to be applied and has a lower cost. In addition, as the powder coating does not contain a solvent and is pollution-free, forming the base layer 110 with the powder coating of the epoxy resin system is able to meet the national environmental requirements and bring about no pollution to the environment. Further, the powder coating of the epoxy resin system is sprayed onto the surface of the housing 110 of the compressor by electrostatic spraying. That is, negatively charged coating particles are attached to the surface of the housing 110 by using a high-voltage electrostatic electric field, so that the coating with a high compactness is able to be formed, and the coating has a better attachment to the housing 110.

Still referring to FIG. 3, in this embodiment, after applying the first organic coating, the method further includes:

Step S11. Bake the first organic coating for curing the first organic coating to form the base layer 131. The curing temperature is preferably from 120° C. to 160° C., and the curing time is preferably from 20 min to 60 min.

After the base layer 131 is formed, the second organic coating is applied onto the surface of the base layer 131, where the second organic coating may be an acrylic amino system coating, and preferably, the acrylic amino system coating is a water-based paint. The water-based paint, as one type of coating, has no inflammable or explosive danger, is safe and non-toxic, and saves resources and reduces pollution to the environment due to the solvent thereof being water rather than organic solvent. Further, the water-based paint of the acrylic amino system may be applied onto the surface of the base layer 131 by dip-coating or spraying.

Moreover, the second organic coating may alternatively be a polyester resin system coating. Preferably, the polyester resin system coating is a powder coating. Correspondingly, the powder coating of the polyester resin system may be sprayed onto the surface of the base layer 131 by electrostatic spraying.

Still referring to FIG. 3, after applying the second organic coating, the method further includes:

Step S21. Bake the second organic coating material for curing the second organic coating to form the surface layer 132. During the process of baking and curing, the curing temperature and the curing time may be determined according to the actual material of the second organic coating. For example, when the second organic coating is the water-based paint of the acrylic amino system, the curing temperature thereof may range from 120° C. to 160° C., and the curing time thereof may be from 15 min to 50 min. When the second organic coating material is the powder coating of the polyester resin system, the curing temperature thereof may be 130° C.-180° C., and a curing time thereof may be 20 min-70 min.

In a preferable solution, after the base layer 131 and the surface layer 132 are formed, the method further includes:

Step S30. Perform coating detection of the anticorrosive coating layer 130, where the coating detection includes the thickness detection, the scratch detection, and/or the bubble detection, to ensure that the formed anticorrosive coating layer 130 meets requirements, and prevents the corrosion resistant performance of the compressor from being affected by damage of the anticorrosive coating layer 130.

In conclusion, in the compressor provided in the present invention, the anticorrosive coating layer includes two organic coating layers, through which the housing of the compressor is able to be isolated from the ambient environment, thereby protecting the compressor against corrosion. In addition, the anticorrosive coating layer in the present invention does not include any metal coating layer, thereby avoiding the severe corrosion of the compressor due to the exposed metal coating layer.

Further, in the processing method of the compressor provided in the present invention, the powder coating of epoxy resin system is used to form a base layer, and the powder coating of the polyester resin system or the water-based paint of acrylic amino system is used to form a surface layer. The coatings are both environmentally friendly coatings. Compared with the paint that has a high toxicity, a strong pollution, and an inflammable and explosive property, the coatings are more environmentally friendly and do not pollute the environment. In addition, the formed coating layers are compact and smooth with strong corrosion resistance and weatherability, thereby increasing the service life of the compressor.

The foregoing description is merely a description of preferred embodiments of the present invention, and not intended to limit the scope of the present invention. Any variations and modifications made by a person of ordinary skilled in the art based on the foregoing disclosed content all fall within the protection scope of the appended claims.

What is claimed is:

1. A compressor, comprising a housing and an anticorrosive coating layer covering a surface of the housing, wherein the anticorrosive coating layer does not comprise a metal coating layer and comprises a phosphating layer applied on the surface of the housing, a base layer applied on the phosphating layer and a surface layer applied on the base layer, and the base layer and the surface layer are both organic coating layers, wherein a material of the base layer is epoxy resin and a material of the surface layer is acrylic amino resin, wherein a thickness of the base layer is in a range of 45 µm to 95 µm, and a thickness of the surface layer made of acrylic amino resin is in a range of 10 µm to 40 µm.

2. The compressor according to claim 1, wherein a material of the housing is carbon steel or gray cast iron.

3. A processing method of a compressor, configured to form an anticorrosive coating layer of the compressor, the processing method comprising:

performing a surface treatment to form a phosphating layer on a surface of a housing of the compressor;

applying a first organic coating onto the surface of the housing of the compressor, to form a base layer made of an epoxy resin system coating with a thickness in a range of 45 µm to 95 µm; and applying a second organic coating onto a surface of the base layer, to form a surface layer made of an acrylic amino system coating with a thickness in a range of 10 µm to 40 µm, wherein the anticorrosive coating layer of the compressor does not comprise a metal coating layer.

4. The processing method of a compressor according to claim 3, wherein the surface treatment comprises performing shot-peening treatment on the surface of the housing of the compressor, or treating the surface of the housing of the compressor by using phosphate to form a phosphating layer.

5. The processing method of a compressor according to claim 3, wherein a time interval between completion of the surface treatment and application of the first organic coating is less than 8 hours.

6. The processing method of a compressor according to claim 3, wherein the epoxy resin system coating is a powder coating.

7. The processing method of a compressor according to claim 6, wherein the powder coating of epoxide resin system is sprayed onto the surface of the housing of the compressor by electrostatic spraying.

8. The processing method of a compressor according to claim 3, wherein the acrylic amino system coating is a water-based paint.

9. The processing method of a compressor according to claim 8, wherein the water-based paint of the acrylic amino system is applied onto the surface of the base layer by dip-coating or spraying.

10. The processing method of a compressor according to claim 3, further comprising baking the first organic coating after applying the first organic coating, and baking the second organic coating after applying the second organic coating.

11. The processing method of a compressor according to claim 3, further comprising performing coating detection on the anticorrosive coating layer after forming the anticorrosive coating layer, wherein the coating detection comprises a thickness detection, a scratch detection, and/or a bubble detection.

* * * * *